US 8,700,821 B2

(12) United States Patent
Chandra et al.

(10) Patent No.: US 8,700,821 B2
(45) Date of Patent: Apr. 15, 2014

(54) UNIFIED MULTI-TRANSPORT MEDIUM CONNECTOR ARCHITECTURE

(75) Inventors: Prashant R. Chandra, Santa Clara, CA (US); Ajay V. Bhatt, Portland, OR (US); Kevin Kahn, Portland, OR (US); Steve McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 12/229,453

(22) Filed: Aug. 22, 2008

(65) Prior Publication Data
US 2010/0049885 A1    Feb. 25, 2010

(51) Int. Cl.

| G06F 3/00 | (2006.01) |
|---|---|
| G06F 5/00 | (2006.01) |
| G06F 13/12 | (2006.01) |
| G06F 13/42 | (2006.01) |
| G01R 31/08 | (2006.01) |
| H04L 12/28 | (2006.01) |
| H04L 12/56 | (2011.01) |
| H04J 3/16 | (2006.01) |
| H04B 10/20 | (2011.01) |
| H04B 10/00 | (2013.01) |
| G02B 6/12 | (2006.01) |
| G02B 6/36 | (2006.01) |
| G02B 6/38 | (2006.01) |
| H01R 13/44 | (2006.01) |
| H01R 33/945 | (2006.01) |

(52) U.S. Cl.
USPC ............ 710/38; 710/11; 710/14; 710/36; 710/65; 710/72; 710/105; 370/248; 370/250; 370/351; 370/389; 370/466; 398/58; 398/135; 385/14; 385/53; 385/58; 439/125; 439/577

(58) Field of Classification Search
USPC ............ 710/36, 11, 14, 38, 65, 72, 105; 370/248, 389, 205, 250, 351, 466; 398/58, 79, 135; 385/48, 58, 14, 53; 439/125, 607, 577, 607.06; 709/205
See application file for complete search history.

(56) References Cited

U.S. PATENT DOCUMENTS 4,767,168 A * 8/1988 Grandy ..................... 385/53
4,969,924 A   11/1990 Suverison et al.
(Continued)

FOREIGN PATENT DOCUMENTS

JP    04-138677 A    5/1992
JP    06-334687 A    12/1994
(Continued)

OTHER PUBLICATIONS

International Search Report/Written Opinion for Patent Application No. PCT/US2009/052831, mailed on Mar. 15, 2010, 13 pages.

(Continued)

Primary Examiner — Farley Abad
Assistant Examiner — Henry Yu
(74) Attorney, Agent, or Firm — Schwabe, Williamson & Wyatt, P.C.

(57) ABSTRACT

A device, method, and system are disclosed. In one embodiment the device includes a router to transmit data packets between multiple host controllers and one or more peripheral devices. The router can receive a data packet from a host controller and transmit the data packet to a peripheral device across a data transmission path. The peripheral device is coupled to the first data transmission path through a first universal multi-transport medium (UMTM) connector. The connector includes an optical coupling capable of transporting the first data packet within an optical signal and an electrical coupling capable of transporting the first data packet within an electrical signal.

14 Claims, 8 Drawing Sheets

(56) References Cited

U.S. PATENT DOCUMENTS

| | | | |
|---|---|---|---|
| 5,109,452 A * | 4/1992 | Selvin et al. | 385/69 |
| 5,242,315 A * | 9/1993 | O'Dea | 439/577 |
| 5,267,337 A * | 11/1993 | Kirma | 385/75 |
| 5,419,717 A * | 5/1995 | Abendschein et al. | 439/577 |
| 5,535,036 A | 7/1996 | Grant | |
| 6,108,782 A * | 8/2000 | Fletcher et al. | 713/153 |
| 6,272,551 B1* | 8/2001 | Martin et al. | 709/250 |
| 6,478,625 B2* | 11/2002 | Tolmie et al. | 439/607.06 |
| 6,536,670 B1* | 3/2003 | Postman et al. | 235/487 |
| 6,549,966 B1 | 4/2003 | Dickens et al. | |
| 6,588,938 B1* | 7/2003 | Lampert et al. | 385/58 |
| 6,839,771 B1 | 1/2005 | Bouchier et al. | |
| 7,002,996 B1 | 2/2006 | Dougherty et al. | |
| 7,023,356 B2 | 4/2006 | Burkhardt et al. | |
| 7,081,023 B2* | 7/2006 | Zhang et al. | 439/668 |
| 7,095,927 B2* | 8/2006 | Yamada et al. | 385/48 |
| 7,184,440 B1 | 2/2007 | Sterne et al. | |
| 7,330,468 B1 | 2/2008 | Tse-Au | |
| 7,412,544 B2 | 8/2008 | Gibson et al. | |
| 7,646,981 B2* | 1/2010 | Coffey | 398/79 |
| 7,677,813 B2 | 3/2010 | Anrig et al. | |
| 7,729,617 B2* | 6/2010 | Sheth et al. | 398/135 |
| 8,051,217 B2 | 11/2011 | Goodart et al. | |
| 8,078,894 B1 | 12/2011 | Ogami | |
| 8,121,139 B2 | 2/2012 | Sunaga et al. | |
| 2002/0049862 A1 | 4/2002 | Gladney et al. | |
| 2002/0160656 A1* | 10/2002 | Nishita | 439/577 |
| 2003/0126319 A1 | 7/2003 | Adusumilli et al. | |
| 2003/0179711 A1* | 9/2003 | Huff | 370/248 |
| 2003/0208652 A1* | 11/2003 | Kuhlmann et al. | 710/305 |
| 2004/0246996 A1 | 12/2004 | Engel | |
| 2005/0086549 A1 | 4/2005 | Solomon et al. | |
| 2005/0102682 A1* | 5/2005 | Shah et al. | 719/321 |
| 2005/0281286 A1 | 12/2005 | Wang et al. | |
| 2005/0283549 A1 | 12/2005 | Gibson et al. | |
| 2006/0064522 A1 | 3/2006 | Weigold et al. | |
| 2006/0203851 A1 | 9/2006 | Eidson | |
| 2006/0206655 A1 | 9/2006 | Chappell et al. | |
| 2007/0005867 A1 | 1/2007 | Diamant | |
| 2007/0249193 A1* | 10/2007 | Penumatcha et al. | 439/125 |
| 2007/0297799 A1* | 12/2007 | Tse-Au | 398/58 |
| 2008/0025289 A1 | 1/2008 | Kapur et al. | |
| 2008/0028120 A1 | 1/2008 | McLeod | |
| 2008/0062980 A1* | 3/2008 | Sunaga et al. | 370/389 |
| 2008/0069120 A1 | 3/2008 | Badt et al. | |
| 2008/0150645 A1 | 6/2008 | McCorquodale et al. | |
| 2009/0028495 A1* | 1/2009 | Anrig et al. | 385/14 |
| 2009/0106430 A1 | 4/2009 | Matters et al. | |
| 2009/0172185 A1 | 7/2009 | Chandra et al. | |
| 2010/0085989 A1 | 4/2010 | Belhadj et al. | |
| 2010/0135314 A1 | 6/2010 | Fourcand | |
| 2011/0052199 A1 | 3/2011 | Beshai | |
| 2011/0055611 A1 | 3/2011 | Sharma et al. | |
| 2011/0182274 A1 | 7/2011 | Barry et al. | |

FOREIGN PATENT DOCUMENTS

| | | |
|---|---|---|
| JP | 08-316914 A | 11/1996 |
| JP | 10-233820 | 9/1998 |
| JP | 10-243016 A | 9/1998 |
| JP | 2001-168380 A | 6/2001 |
| JP | 2001-358733 | 12/2001 |
| JP | 2002-190344 A | 7/2002 |
| JP | 2002-318725 A | 10/2002 |
| JP | 2003-244217 A | 8/2003 |
| JP | 2006-115362 A | 4/2006 |
| JP | 2006-245894 A | 9/2006 |
| KR | 1020010076079 | 8/2001 |
| TW | I249313 B | 2/2006 |
| WO | 2009039034 A1 | 3/2009 |
| WO | WO2009085494 | 7/2009 |
| WO | 2010/021844 A2 | 2/2010 |
| WO | 2010/021844 A3 | 5/2010 |

OTHER PUBLICATIONS

International Preliminary Report on Patentability and Written Opinion received for PCT Application No. PCT/US2009/052831, Mailed on Mar. 3, 2011, 8 pages.
European Search Report received for European Patent Application No. 09808593.9, mailed on Aug. 19, 2011, 3 pages.
International Search Report & Written Opinion for PCT/US2008/084621, mailed May 18, 2009.
International Preliminary Report on Patentablity for PCT/US2008/084621, mailed Jul. 8, 2010.
Office action for Taiwan Application No. 97147418, mailed Jun. 14, 2012.
Office action for Korean Application No. 10-2010-7016587, mailed Jul. 11, 2011.
Office action for Korean Application No. 10-2010-7016587, mailed Apr. 26, 2012.
Office action for Japanese Application No. 2010-540703, mailed Nov. 22, 2011.
Search Report for European Application No. 08868735.5, mailed Sep. 2, 2011.
Office action for European Application No. 08868735.5, mailed Sep. 29, 2011.
Office action for Chinese Application No. 200880122959.5, mailed Mar. 19, 2012.
Office action for European Application No. 09808593.9, mailed Sep. 13, 2011.
Office Action mailed Dec. 12, 2012 for Taiwan Patent Application No. 097147418, 6 pages.
Taiwan IPO Search Report issued Nov. 16, 2012 for Taiwan Patent Application No. 097147418, 1 pages.
International Search Report & Written Opinion for PCT/US2012/067438 mailed Mar. 11, 2013.
International Search Report & Written Opinion for PCT/US2012/067439, mailed Mar. 5, 2013.
International Search Report & Written Opinion for PCT/US2012/067393 mailed Mar. 8, 2013.
Search Report for Taiwan Application No. 98127253, mailed Nov. 12, 2012.
Office Action for Korean Application No. 10-2011-7003986, mailed Jul. 18, 2012.
Office Action for JP 2011-523856, mailed Mar. 12, 2013.
Notice of Allowability for U.S. Appl. No. 11/964,666 dated Nov. 23, 2012.
Office Action mailed Dec. 3, 2012 for Chinese Patent Application No. 200880122959.5, 4 pages.
International Search Report & Written Opinion for PCT/US2013/033533, mailed Jul. 23, 2013.
Final Office Action for U.S. Appl. No. 11/964,666 mailed Jan. 24, 2011.
Notice of Allowability for U.S. Appl. No. 11/964,666 mailed Apr. 12, 2012.
Non-Final Office Action for U.S. Appl. No. 13/338,236, mailed Jul. 1, 2013.
Office Action for Japanese Application No. 2011-523856, mailed Aug. 6, 2013.
Office Action for CN Application No. 200880122959.5 mailed Mar. 27, 2013.
Office Action for CN200980136965.0 mailed Apr. 27, 2013.

* cited by examiner

Current Discrete Graphics Card

Discrete Graphics Card with UCA

Current Discrete LAN Card

Discrete LAN Card with UCA

FIG. 8

UNIFIED MULTI-TRANSPORT MEDIUM CONNECTOR ARCHITECTURE

CROSS REFERENCE TO RELATED APPLICATIONS

This application is related to U.S. patent application Ser. No. 11/964,666 titled "Unified Connector Architecture," which was filed on Dec. 26, 2007; and U.S. patent application Ser. No. 11/965,451 titled "Unified Optical Connector Architecture," which was filed on Dec. 27, 2007; both applications are entirely incorporated by reference.

FIELD OF THE INVENTION

The invention relates to the implementation of a unified multi-transport medium connector architecture across a computer system.

BACKGROUND OF THE INVENTION

Current computer platform architecture has a variety of host controllers to implement a number of different types of I/O between computer platforms and peripherals that are connected to the platforms. For example, a graphics host controller potentially has analog and digital ports with corresponding connection interfaces (i.e. the plugs at the ends of the cables connecting a display device to a computer platform. Local area network controllers within the platform commonly have one or more Ethernet jacks. The Universal Serial Bus (USB) subsystem has a number of associated USB plug interfaces, such as those discussed in the USB 2.0 Specification published on Apr. 27, 2000 as well as in many other revisions of the USB specification. Versions of the Institute of Electrical and Electronics Engineers (IEEE) 1394 "Firewire" specification, such as version 1394-1995, published on Aug. 30, 1996 or any subsequent version, also includes one or more plug interfaces. There are many other standards not listed which also provide plug interfaces. The list of separate and distinct ports and the associated hardware interfaces to plug peripherals into a computer platform is significant in size. Computer platforms with all of these interfaces and corresponding hardware jacks/plugs have a significant requirement for large amount of motherboard and case real estate to get all of this hardware in one spot. This has limited the ability for mobile computers to have a full complement of these interfaces and the rear peripheral interface panel on many desktop systems has unfortunately grown in size as well.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device, method, and system to implement unified multi-transport medium (UMTM) connector architecture are disclosed. The system includes a universal connector port that has multiple transport mediums, notably an optical transport medium and an electrical transport medium. A computer system implementing the UMTM architecture may be capable of having high speed display and network peripheral devices coupled to the system as well as low speed universal serial bus (USB) peripheral devices coupled up to peripheral device ports with a common plug form factor. The UMTM connector ports allow high-speed peripheral devices to be coupled to the computer system through an optical link and low-speed peripheral devices to be coupled to the computer system through an electrical link.

Logic within a UMTM scheduler and router device within the computer system schedules data packets received from one or more host controllers in the computer system in an order based on the bandwidth requirements of the peripheral devices and host controllers present in the system. The logic also routes the data packets between a particular host controller and a particular peripheral device and manages the encapsulation of native host controller packets into unified frame protocol packets. Additional logic is capable of converting electrical signals carrying data packets from host controllers into optical signals to be transported at a very high bandwidth across an optical link. The conversion logic is also capable of converting the optical signal back into electrical signal to allow data packets sent from a high-speed peripheral within an optical signal to be received by a target host controller as an electrical signal. The enumeration of devices within the UMTM connector architecture and the operation of the architecture itself is implemented similarly to a USB architecture.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Embodiments of a method, device, and system to implement unified multi-transport medium (UMTM) connector architecture are disclosed. The system includes a universal connector port that has multiple transport mediums, notably an optical transport medium and an electrical transport medium. A computer system implementing the UMTM architecture would be capable of having high-speed display and network peripheral devices coupled to the system as well as low speed universal serial bus (USB) peripheral devices coupled up to peripheral device ports with a common plug form factor. The UMTM connector ports allow high-speed peripheral devices to be coupled to the computer system through an optical link and low-speed peripheral devices to be coupled to the computer system through an electrical link. Logic within a UMTM scheduler and router device within the computer system schedules data packets received from one or more host controllers in the computer system in an order based on the bandwidth requirements of the peripheral devices and host controllers present in the system. The logic also routes the data packets between a particular host controller and a particular peripheral device and manages the encapsulation of native host controller packets into unified frame protocol packets. Additional logic is capable of converting electrical signals carrying data packets from host controllers into optical signals to be transported at a very high bandwidth across an optical link. The conversion logic is also capable of converting the optical signal back into electrical signal to allow data packets sent from a high-speed peripheral within an optical signal to be received by a target host controller as an electrical signal. The enumeration of devices within the UMTM connector architecture and the operation of the architecture itself is implemented similarly to USB.

The actual electrical and optical specifications as well as the physical form factor of the UMTM port could be one of a number of possible embodiments, including a port similar to a USB standard, a IEEE 1394 "Firewire" standard, or any other comparable standard protocol with certain basic minimum device discovery and maintenance abilities.

Figure 1:
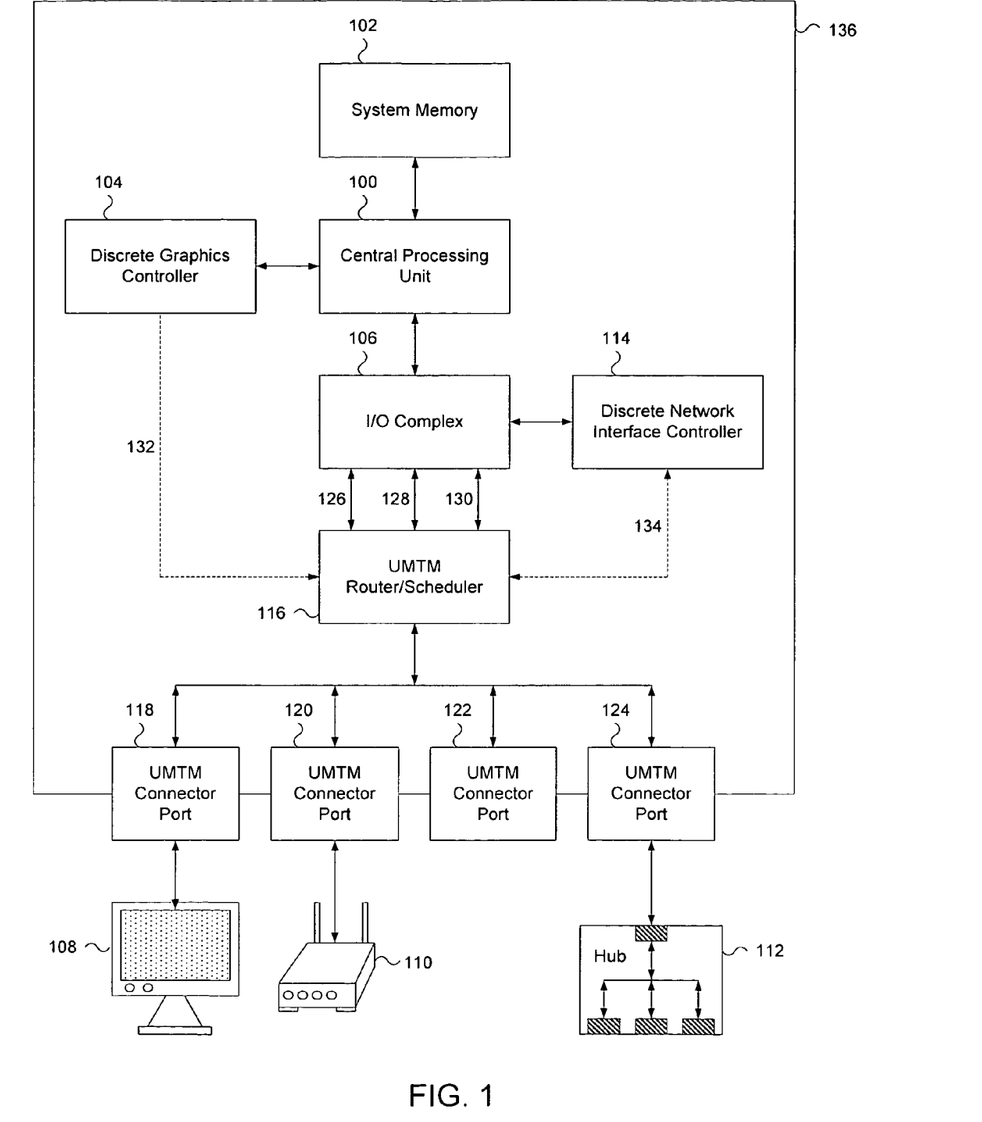
FIG. 1 describes one embodiment of a system-level implementation of a unified multi-transport medium (UMTM) connector architecture.

FIG. 1 describes one embodiment of a system-level implementation of a unified multi-transport medium connector architecture. In many embodiments, the system includes one or more processors, such as central processing unit (CPU) 100. In different embodiments, CPU 100 may include one core or multiple cores. In some embodiments, the system is a multiprocessor system (not shown) where each of the processors has one core or multiple cores.

CPU 100 is coupled to system memory 102 through one or more high-speed links (i.e. interconnects, buses, etc). System memory 102 is capable of storing information that CPU 100 utilizes to operate and execute programs and operating systems. In different embodiments, system memory 102 may be any usable type of readable and writeable memory such as a form of dynamic random access memory (DRAM).

In some embodiments, CPU 100 is also coupled to a discrete graphics controller 104 through an additional high-speed link. The discrete graphics controller 104 may be physically coupled to a motherboard or other such printed circuit board through a slot connector. In many embodiments, the discrete graphics controller may be a PCI Express® graphics controller/card that is plugged into a PCI Express® graphics slot connector. In this case, the PCI Express® graphics controller/card may be compliant with a revision of the specification such as PCI Express® Base Specification, Rev. 2.0, published on Dec. 20, 2006. In other embodiments, the discrete graphics controller utilizes a protocol other than PCI Express®. In some embodiments, CPU 100 is coupled to multiple discrete graphics controllers (embodiments with multiple discrete graphics controllers are not shown).

CPU 100 is also coupled to I/O complex 106, in many embodiments. I/O complex 106 may house one or more I/O host controllers, each of which control one or more I/O links that allow CPU 100 to communicate with I/O peripherals attached to the computer system. I/O peripherals such as display 108 and wireless router 110 are examples of I/O peripherals that may be attached to the computer system.

I/O complex 106 is coupled to a discrete network interface controller (NIC) 114, in many embodiments. Discrete NIC 114 is capable of providing an interface between the computer system and one or more networks external to the computer system. These networks may include networks such as wireless and wired intranet networks within a domain that the computer is located within or they may also include the Internet itself.

In many embodiments, the system in FIG. 1 includes a unified multi-transport medium connector architecture (UMTM) router/scheduler 116, which is coupled to one or more unified connector ports by way of one or more high-speed links. Here, four unified connector ports are shown: port 118, port 120, port 122, and port 124. The UMTM router/scheduler 116 is also coupled to I/O complex 106 through one or more I/O links, as mentioned above. These include I/O links such as the Universal Serial Bus (USB) and/or any other potential I/O links. FIG. 1 shows three such links: I/O link 126, I/O link 128, and I/O link 130.

UMTM router/scheduler 116, in many embodiments, is a discrete component on the motherboard 136 in the computer system. In other embodiments, the UMTM router/scheduler may be integrated into I/O complex 106 (these embodiments are not shown).

In previously implemented computer systems, an end point of an I/O link, opposite the I/O complex 106, would be a protocol-specific port that would allow a compatible peripheral to be attached to the port (i.e. a USB keyboard device would be plugged into a USB port, a wireless router device would be plugged into a LAN/Ethernet port, etc.). Any single port would be limited to devices with a compatible plug and compatible protocol. Once a compatible device is plugged into the port, a communication link would be established between the I/O complex and the peripheral.

In the computer system as described in the embodiment shown in FIG. 1, the I/O links (126-130) couple the I/O complex 106 with the UMTM router/scheduler 116, the router then encapsulates data packets, originally sent in the specific native host controller protocol data packet format, to a unified frame protocol data packet format. The UMTM router/scheduler 116 then routes (i.e. transmits) the unified frame protocol data packet to the UMTM connector port that has the target peripheral attached (i.e. communicatively coupled, plugged into, etc). Thus, in these embodiments, I/O peripherals such as display 108 and wireless router 112 all are compatible with the unified frame protocol and have UMTM connector form factor plugs to plug into any one of the UMTM connector ports (118-124). The UMTM connector/plug form factor is described in greater in FIG. 3 and the related discussion below.

Additionally, the UMTM router/scheduler 116 translates unified frame protocol data packets coming from any of the connected peripherals to the protocol that is native to the targeted I/O host controller within the I/O complex.

Thus, I/O data (e.g. display, networking, USB, etc), both sent from the computer system to a peripheral and sent from a peripheral to the computer system, are packetized and encapsulated at the physical layer inside each unified frame protocol data packet. In regard to the discrete graphics and discrete NIC controllers, these controllers generate and receive I/O data that is formatted according to the physical layers defined by their respective protocol stacks. When this data is carried over a UMTM connector port, it is further encapsulated within a packet format (i.e. frame format) defined by the unified frame protocol. The specific implementation of how the UMTM router/scheduler 116 accomplishes the encapsulation and packetization is described in detail below in reference to FIG. 2.

Returning to FIG. 1, in many embodiments, additional dedicated links are shown directly coupling the discrete graphics controller 104, as well as the discrete NIC 114, to the UMTM router/scheduler 116. These links are shown as dotted-line links 132 and 134 respectively. The display and network dotted-line links allow a display device and/or a network device to be plugged into the computer system through a UMTM connector port (e.g. one of UMTM connector ports 118-124). Links 132 and 134 remove the previously necessary display and network coupling locations from ports attached directly to the discrete cards. For example, previously a display peripheral (i.e. a flat-panel monitor) was plugged directly into the display port on the graphics card. With the unified connector architecture implementation, the display and network device(s) are attached to a unified connector port, which may be located on the system motherboard 136 instead of on the discrete graphics controller 104 card.

Figure 2:
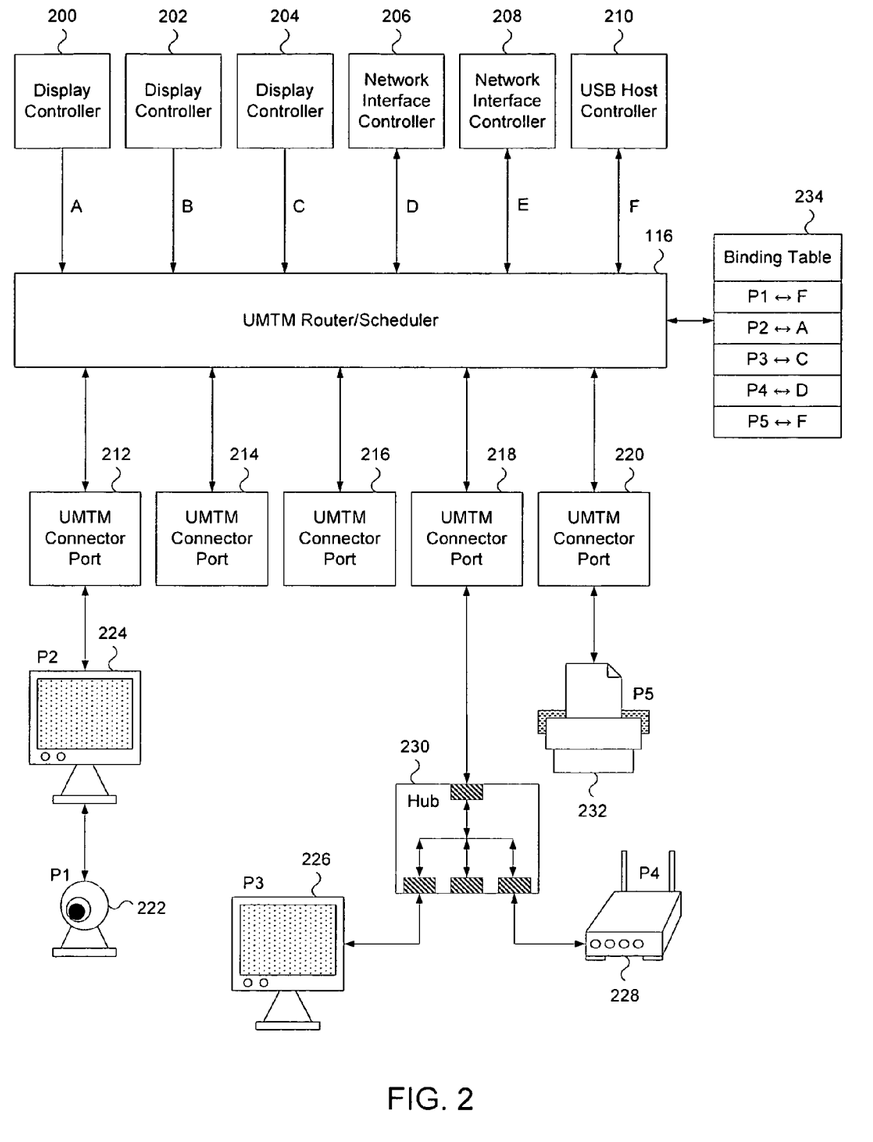
FIG. 2 describes one embodiment of a UMTM router/scheduler and accompanying UMTM connector architecture logic.

FIG. 2 describes one embodiment of a UMTM router/scheduler and accompanying UMTM connector architecture logic. The UMTM router/scheduler 116 is shown, as in FIG. 1, coupled to several host controllers (display controllers 200, 202, and 204, NICs 206 and 208, and USB host controller 210). Additionally, UMTM router/scheduler 116 is also coupled to several UMTM connector ports (ports 212-220). Furthermore, a number of peripherals are attached to several of the UMTM connector ports. Peripheral 1 (P1) web camera 222 is coupled to peripheral 2 (P2) display monitor 224 which is coupled to UMTM connector port 212. Peripheral 3 (P3) display monitor 226 and peripheral 4 (P4) wireless router 228 are both coupled to UMTM hub 230, which is coupled to UMTM connector port 218. Finally, peripheral 5 (P5) USB printer 232 is coupled to unified connector port 220.

In many embodiments, the UMTM connector architecture employs packet switching communication to exchange data between the host controllers (200-210) and the attached peripherals (222-230). Packet switching is a common packet transmission method from between a host controller and a peripheral device. A common discovery protocol is utilized to enumerate the peripherals connected to the platform and also to detect any hot-plug of peripherals. Once the peripherals are enumerated, a data transfer protocol is used to exchange application I/O data between a specific host controller and a specific peripheral. In some embodiments, the UMTM connector architecture discovery and data transfer protocols may be extensions of the respective USB 2.0 protocol counterparts (as defined in USB Specification, Revision 2.0, published on Apr. 27, 2000). In other embodiments, the UMTM connector architecture discovery and data transfer protocols may be an extension of any other type of feasible device discovery and data transfer protocol available.

The enumeration of the attached peripherals (222-230) is performed by logic within the UMTM router/scheduler. The enumeration logic is responsible for identifying the type of the peripheral connected to a UMTM connector port (e.g. a display, a network device, a USB device, etc.) and assigning a unique address to the peripheral. In many embodiments, multi-function devices are assigned multiple addresses.

In many embodiments, the association between each peripheral (P1-P5) and the specific host controller (one of 200-210) that handles the peripheral's I/O data is defined in a binding table 234. The binding table may be implemented in any type of memory within the system, such as system memory, a cache, a buffer, etc. The UMTM router/scheduler 116 uses the binding table to find the correct unified data packet (i.e. frame) transmission target. Using the binding table, the transmission target is dependent upon the origination of the packet/frame being sent. If the router receives a data packet from a host controller (i.e. the display controller, network controller, I/O controller, etc), the target is the port where the intended target peripheral is coupled (i.e. plugged into). If the router receives a unified connector protocol data packet from the unified connector port (i.e. the data packet initiates from the peripheral device coupled to the port), the target is the host controller bound to that peripheral. For example, display controller 200 sends a packet of display data targeting the P2 display 224, the UMTM router/scheduler 116 receives the packet, determines the target peripheral (P2) using the binding table (e.g. P2 is bound to the A link, which is coupled to display controller 200), encapsulates the data packet into a unified frame protocol data packet, and sends the packet to P2 through UMTM connector port 212. In many embodiments, peripherals can be chained together off of a single port, such as P1 being chained to P2, which is coupled to unified connector port 212. FIG. 2 shows an instance of the binding table that clarifies P1 is bound to link F (USB host controller 210), P2 is bound to link A (display controller 200), P3 is bound to link C (display controller 204), P4 is bound to link D (network interface controller 206), and P5 is also bound to link F (USB host controller 210).

In many embodiments, the binding table is initially setup by the enumeration logic within the UMTM router/scheduler 116 at system boot (i.e. when the system power is cycled, or when the controlling operating system performs a soft restart of the computer). It can also be re-mapped during runtime by system software (an operating system or a virtual machine manager) to implement changing usage models based on dynamic switching of system I/O flows. For example, in a mobile platform, a display peripheral can be associated with a discrete graphics controller when the system is plugged in and can be dynamically switched to an integrated graphics controller when the system is running on a battery by remapping the binding information.

Figure 3:
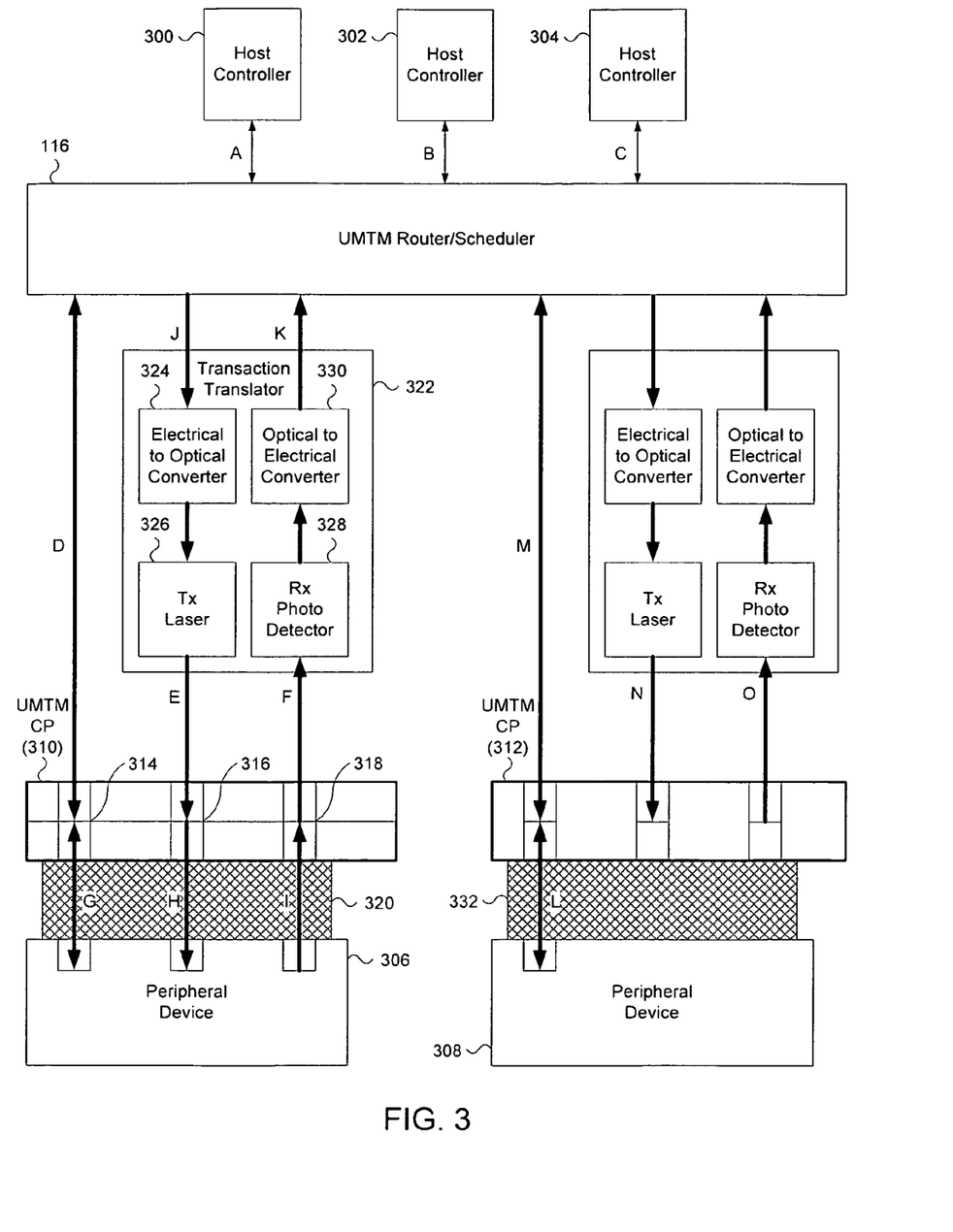
FIG. 3 describes an embodiment of the conversion and transmission logic within a unified optical connector port.

FIG. 3 describes an embodiment of the conversion and transmission logic within a unified optical connector port. In many embodiments, the UMTM router/scheduler 116 is electrically coupled to host controllers 300, 302, and 304, which refers to an electrical link (i.e. interconnect, bus) physically connecting a host controller to the UMTM router/scheduler 116. For example, host controller 300 is electrically coupled to the UMTM router/scheduler 116 by link A.

The UMTM router/scheduler 116 is also coupled to one or more peripheral devices (such as peripheral devices 306 and 308), each through a UMTM connector port (CP) (such as UMTM CPs 310 and 312, respectively). The UMTM connector ports are designed to allow external peripheral devices to be plugged into a computer system. Thus, in many embodiments, everything above UMTM connector ports 310 and 312 in FIG. 3 is internal to the computer system (e.g. a host controller) and everything below UMTM connector ports 310 and 312 is external to the computer system (i.e. a flat-panel display peripheral device).

In many embodiments, each UMTM connector port includes an electrical coupling mechanism and an optical coupling mechanism. The electrical coupling mechanism allows for information to flow within an electrical signal, transmitted on an electrical data transmission path (e.g. one or more copper wires), between devices inside the computer system (such as host controllers 300-304) and devices external to the computer system (such as peripheral devices 306 and 308). The optical coupling mechanism allows for information to be transported within an optical signal at least for a portion of a data transmission path between devices inside the computer system and devices external to the computer system across an optical data transmission path.

Specifically, UMTM connector port 1 (310) has an electrical coupling mechanism 314 to couple electrical data link D to peripheral device 306. Additionally, UMTM connector port 1 (310) has an optical coupling mechanism that includes a downstream optical coupling 316 to couple optical link E to peripheral device 306 and an upstream optical coupling 318 to couple optical link F to peripheral device 306. Link D transports data packets in an electrical medium (i.e. an electrical signal transmitted across link D) between the computer system and peripheral device 306. Link E transports data packets in an optical transport medium (i.e. an optical signal transmitted across link E) from the computer system to peripheral device 306 and link F transports data packets in an optical medium (i.e. an optical signal transmitted across link F) from peripheral device 306 to the computer system. In many embodiments, a host controller (such as host controller 300, 302, or 304) may be the originator of the data packets from the computer system. Additionally, in many embodiments, peripheral device 306 may be the originator of the data packets from peripheral device 306, though, in other embodiments, an additional peripheral device (not pictured) coupled to peripheral device 306 may be the originator of the data packets from peripheral device 306.

In many embodiments, peripheral device 306 includes UMTM cable 320 which has a plug at the end of the cable opposite the peripheral device utilized to plug the cable into UMTM connector port 1 (310). There are potentially multiple links within UMTM cable 320 that can each transport data packets between the computer system and peripheral device 306. In many embodiments, UMTM cable 320 includes an electrical link G to transport data packets within an electrical signal between the peripheral device and UMTM connector port 1 (310). Also, in many embodiments, UMTM cable 320 includes an optical link, which has a downstream optical link H to transport data packets within an optical signal from UMTM CP 310 to peripheral device 306 and an upstream optical link I to transport data packets within an optical signal from peripheral device 306 to UMTM CP 310.

Notably, the electrical and optical couplings within UMTM CP 310 may be utilized as a simple pass-through coupling mechanism in many embodiments. Therefore, a data packet within an electrical signal transmitted from UMTM router/scheduler 116 across link D would pass directly through electrical coupling 314 and, thus, also across electrical link G in UMTM cable 320 to arrive at peripheral device 306. This pass-through coupling mechanism that effectively couples the links on either side of UMTM CP 310 together would also be capable of performing an electrical signal pass-through transmitted from peripheral device 306, across link G, passing through to link D, and arriving at UMTM router/scheduler 116. Furthermore, this coupling functionality works similar for data packets contained within an optical signal passed from to link E (through optical coupling 316) to link H, as well as from link I (through optical coupling 318) to link F.

The optical signals transported across downstream optical link E and upstream optical link F requires an eventual translation (i.e. conversion) to electrical signals because the host controllers 300, 302, and 304 send and receive data packets exclusively across electrical links A, B, and C respectively. Thus, in many embodiments, a transaction translator that includes logic to perform electrical-to-optical and optical-to-electrical conversions is positioned at some location on the data transmission path between the host controllers and the peripheral device. For example, in some embodiments, transaction translator 322 is coupled to electrical links J and K, which are also coupled to UMTM router/scheduler 116. In some embodiments, transaction translator 322 is located within UMTM CP 310, thus, in these embodiments, links E and F may no longer be needed.

When a data packet is transmitted by UMTM router/scheduler 116 within an electrical signal across electrical link J, the electrical signal arrives at transaction translator 322 and is received by electrical-to-optical converter 324. Electrical-to-optical converter 324 then converts the electrical signal to an optical signal and utilizes transmission (Tx) laser 326 to transmit the optical signal containing the packet across optical link E through UMTM CP 310 and eventually arriving at peripheral device 306. Alternatively, when a data packet is transmitted by peripheral device 306 within an optical signal across optical link I, the optical signal pass through UMTM CP 310 and across optical link F where it eventually arrives at transaction translator 322. Reception (Rx) photo detector 328 receives the signal by detecting the transmitted laser pulses within the optical signal. The Rx photo detector feeds the detection information to optical-to-electrical converter 330, which then converts the optical signal to an electrical signal and transmits the converted electrical signal to UMTM router/scheduler 116.

The UMTM-enabled system, as shown in FIG. 3, allows for peripheral devices that require enhanced data throughput to communicate with host controllers within the computer system across the high-speed optical portion of the transmission path. Though, for backward compatibility to older peripheral devices that do not have optical transmission path capabilities, the UMTM-enabled system additionally allows for legacy peripheral devices that only have electrical transmission path capabilities to also communicate with the host controllers in the computer system.

Thus, the enumeration process for a peripheral device, as discussed above regarding FIG. 2, includes the UMTM router/scheduler 116 determining whether the peripheral device is optically compatible or just electrically compatible. In certain embodiments, a device may be both optically and electrically compatible, such as peripheral device 306 in FIG. 3. If a device is both optically and electrically compatible, in many embodiments, the device would prefer to send and receive data packets across the high-speed optical link for greater performance due to the optical path's greater data throughput capacity.

In many embodiments, each data packet sent between the UMTM router/scheduler 116 a peripheral device may have an assigned priority level. The assigned priority level of a data packet may be based on the importance of the data within the data packet. For example, if live video frames are being sent to a peripheral device for display, the priority level of the data packets that have the video frames normally would be of higher priority level than data packets that have information related to a print job sent to a printer. Thus, the data packets with the live video frames would be deemed to have higher priority than the data packets with the print job.

In many embodiments, a peripheral device, or a group of peripheral devices chained to a single UMTM CP, may have multiple types of data packets with different priority levels. Thus, a prioritization scheme may be implemented for the entire set of packets being sent and received between the UMTM router/scheduler 116 and the peripheral device(s). Thus, if two data packets of different priority levels are being sent from the UMTM router/scheduler 116 to one or more peripheral devices across the same UMTM CP, in many embodiments, the UMTM router/scheduler 116 may make multiple determinations to route the packets across the correct transport medium.

For example, if the optical link coupling the UMTM router/scheduler 116 to the peripheral device(s) has the capacity for both packets without a significant slow down, then the UMTM router/scheduler 116 may route both packets to be transported across the optical link. On the other hand, if the optical link is busy and does not have excess bandwidth to utilize, then the UMTM router/scheduler 116 may make a priority determination and send the higher priority data packet across the optical link and the lower priority data packet across the electrical link.

In certain cases, if the optical link is extremely busy, the UMTM router/scheduler 116 may make a determination to send the higher priority packet across the electrical link if that is determined to be the fastest way to get the packet to the target peripheral device due to optical link congestion.

In many embodiments, there are several priority levels available to designate each data packet (i.e. more than just a high priority and low priority). The number of priority levels can vary based on implementation of the priority system within the UMTM router/scheduler 116 and may be a function of the number of categories/types of data capable of being sent within a given data packet.

In many embodiments, display traffic and network traffic may comprise high priority data packets. Whereas, USB traffic (such as USB 1.0 and USB 2.0 traffic) may comprise low priority data packets. Furthermore, although the embodiments shown are limited to network, display, and USB traffic, other embodiments that are not shown may include any other type of traffic that would be sent between a host controller or other controlling device and a compatible peripheral device.

In many embodiments, for a given UMTM CP that is the target of data packet transmissions, the UMTM router/scheduler 116 will transmit the data packets to the UMTM CP across both the high-performance optical link portion of the path and the low-performance electrical link portion of the path.

Peripheral device 308 is not compatible with the high-performance optical link portion of the data path in many embodiments. Thus, UMTM cable 332 coupling peripheral device 308 to the computer system through UMTM CP 312 only includes electrical link L. Although the transmission path on the computer system side of UMTM CP 312 (above the connector port) has both electrical link M and an optical link including downstream optical link N and upstream optical link O, only electrical link M can be utilized because peripheral device 308 is not compatible with the high-performance optical portion of the transmission path. Thus, upon enumeration, UMTM router/scheduler 116 realizes that peripheral device 308 is not compatible with the high-performance optical link and adjusts the scheduling of the data packets to and from peripheral device 308 accordingly.

In many embodiments, each of the optical portion and electrical portion of the data transmission paths are referring specifically to the transmission of data packets, not control, address, and timing information. Thus, in many embodiments, though not shown in FIG. 3, each electrical data transmission path and each optical data transmission path includes other transmission lines that may be electrical lines to transmit any non-data packet related information.

In many embodiments, data packets with both low and high priorities are all sent across the optical data path if there is enough bandwidth on the optical data path to accommodate the entire amount of data packets. In these embodiments where a peripheral device is capable of sending and receiving both electrical and optical signals, the UMTM router/scheduler 116 first makes a determination as to whether the optical data path links (i.e. J and K) have the capacity to handle all data packets being transported between the UMTM router/scheduler 116 and peripheral device 306. If so, then both the high priority data packets and low priority data packets are transported across the optical path. Otherwise, if the optical path is at its capacity, then the UMTM router/scheduler arbitrates which data packets are allowed to be transported using the optical signal and which will be transported using the electrical signal. The determination may be based on the priority of each packet. In another embodiment, a priority level threshold may be utilized where data packets with a priority level equal to or exceeding the threshold priority level are transported across the optical path, whereas data packets with a priority level lower than the threshold level may be forced to use the electrical path.

Figure 4:
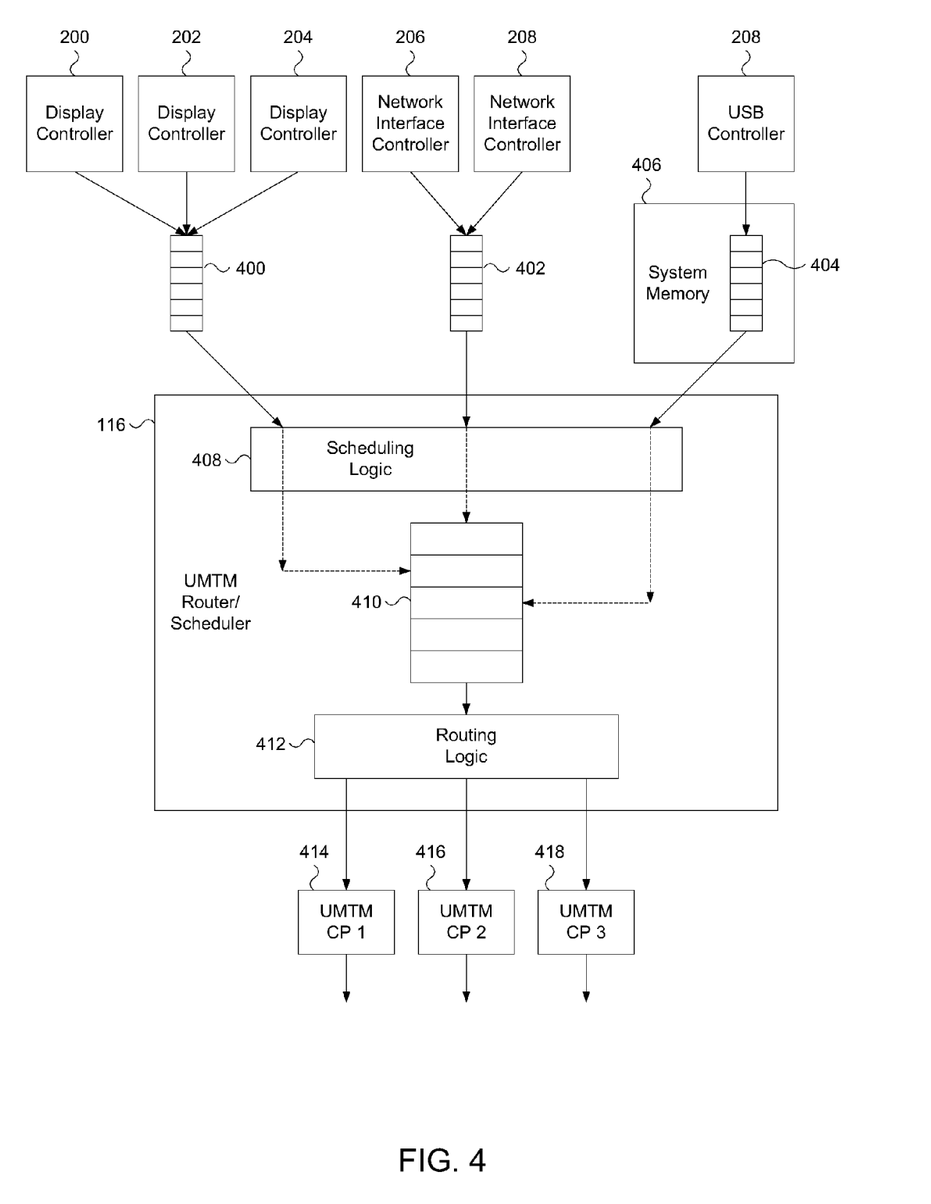
FIG. 4 describes an embodiment of the operational logic within the UMTM router/scheduler.

FIG. 4 describes an embodiment of the operational logic within the UMTM router/scheduler. UMTM router/scheduler 116 is coupled to a number of host controllers, including display controllers 200-204, NIC controllers 206 and 208, and USB controller 210. The data packet output from the display controllers 200-204 feeds an isochronous display queue (IDQ) ring buffer 400. The data packet output from NIC controllers 206 and 208 feeds an isochronous network queue (INQ) ring buffer 402. And the data packet output from the USB controller 210 feeds an isochronous USB queue (IUQ) ring buffer 404. In many embodiments, the IUQ ring buffer 404 is implemented as a normal isochronous USB queue that is stored in system memory 406. In different embodiments, the isochronous queues may be stored in any potential storage location within the computer system. For example, though not shown, the IDQ 400 and the INQ 402 may be stored within the UMTM router/scheduler 116. In other embodiments that are not shown, instead of having an isochronous queue per transaction type (display, network, USB), there may be an isochronous queue per controller.

Scheduling logic 408 within the UMTM router/scheduler 116 has access to all three queues: the IDQ 400, the INQ 402, and the IUQ 404. Scheduling logic 408 implements the bandwidth scheduling of the isochronous pipes as per a UMTM protocol specification. A specialized isochronous transaction descriptor (iTD) is used for display and network I/O. This iTD contains a flag that indicates to the scheduling logic if the iTD is for display or network I/O. For display and LAN iTDs, the scheduler de-queues the isochronous frames (i.e. data packets) from the queues and sends them to an output buffer 410. In the embodiment shown in FIG. 4, there is a single output buffer 410 that buffers all traffic being sent downstream to one or more peripheral devices. In other embodiments not shown, there are multiple output buffers, such as, for example, one output buffer per UMTM connector port. The scheduling logic 408, utilizes information received upon device enumeration to determine the bandwidth requirements per peripheral device. Thus, the scheduling logic continuously monitors the IDQ 400, INQ 402, and IUQ 404 and switches the isochronous transactions at the front of those queue buffers to the output queue in the order to best meet the bandwidth requirements per host controller/peripheral device pair.

Routing logic 412 takes transactions waiting to be transmitted to one or more UMTM CPs and transmits them to the one or more target ports. As mentioned earlier, in some embodiments, routing logic 412 transmits all data packets over both the electrical signal portion of the transmission path and the optical signal portion of the transmission path to the target connector port. In other embodiments, depending on whether the target peripheral device is a device compatible with the high-performance optical path transmissions or compatible only with the low-performance electrical path transmissions, the routing logic 412 may send the data packets over either the low-performance electrical signal portion of the path or the high-performance optical signal portion of the path.

Upon transmission, the data packet(s) will be sent within either an electrical signal, an optical signal, or both to one or more of UMTM CP 414, 416, or 418.

Routing logic 412 is responsible for the packetization and encapsulation of display and network I/O data. For example, in many embodiments, where a display frame for a display peripheral device is being sent from a display host controller, routing logic might hold a continuous stream of display data while building a UMTM frame protocol data packet (e.g. an entire frame of display data). Thus, the routing logic 412 may store the stream in buffer 410, build individual frames out of the stored stream information, and transmit to the display peripheral device when they are complete.

FIG. 4 only displays the downstream path from the host controllers to the peripheral devices. In many embodiments, the upstream path does not utilize any buffers. Rather, the upstream path may be treated as if there was a direct path from the peripheral to the respective host controller. Thus, two requirements on the upstream path of data for the UMTM router/scheduler 116 would be to have the routing logic 412 translate (i.e. convert) the data packets from the UMTM frame format back into the native format utilized by the specific target host controller and have an optical-to-electrical conversion of the signal if the peripheral device is using the high-performance optical signal portion of the path.

Figure 5:
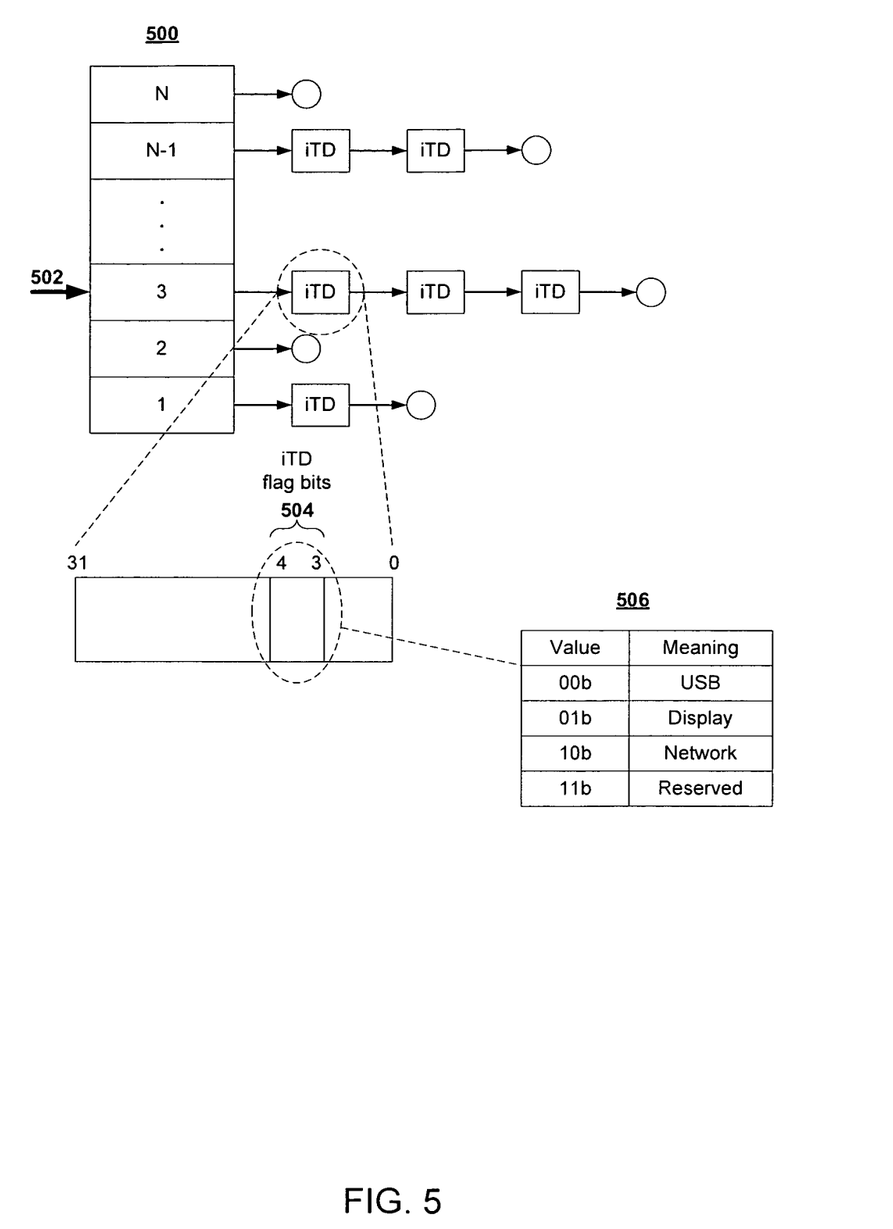
FIG. 5 describes an embodiment of an isochronous transaction descriptor (iTD) ring buffer implemented within a UMTM specification.

FIG. 5 describes an embodiment of an isochronous transaction descriptor (iTD) ring buffer implemented within a UMTM specification. In many embodiments, a host controller frame list 500 is shown. The iTD frame list 500 includes a list of individual frames (1–N where N equals the number of frames in the frame list). Each individual frame either has a pointer to the first transaction descriptor in a transaction descriptor schedule, or a null pointer (designated by a circle). Additionally, a frame list pointer 502 is maintained, which points to the frame in the list where the scheduling logic (408 in FIG. 4) (i.e. the scheduler) is operating. In many embodiments, each frame is given a maximum segment of time that the scheduler can work on the list. Thus, for example, if the segment of time per frame is 125 μS (125 microseconds), then after 125 μS the scheduler will stop executing anything in the linked list pointed to by the current frame list pointer location, increment the frame list pointer to the next frame in the frame list, and start executing at that frame location. This is similar to a current isochronous frame list implementation in USB 2.0.

In many embodiments, the frame list may comprise the implementation of ring buffer 400, 402, or 404 (in FIG. 4) feeding the output buffer (410 in FIG. 4). The scheduler may pull any given iTD from the frame list within the linked list pointed to by the frame at the current location of the frame list pointer 502. For any given input ring buffer feeding, the scheduler can determine the transaction type of the iTD by looking at the iTD flag bits 504 in the transaction descriptor. In many embodiments, the iTD transaction type table 506 shows the values provided in the iTD and what they signify (00b=USB, 01b=display, 10b=network). Additionally, at enumeration of a given peripheral device, the scheduler may set the bandwidth requirements of each of the transaction types in general. Thus, with this information, the scheduler can effectively populate the output buffer (410 in FIG. 4) in a bandwidth optimized priority order.

The UMTM connection ports support the convergence of display I/O, network I/O, and legacy USB I/O. The convergence is done at the physical layer. In other words, the host controllers send the data packets to the UMTM router/scheduler without knowledge that the packets are encapsulated into a universal frame format. Thus, the existing software stacks that manage the transfer of data, from the top-level user application on down through the operating system kernel, are unchanged during actual data transfer. However, the binding table (234 in FIG. 2) usually would be set up at discovery time. Discovery time may be during the boot process for some devices, but for other devices that are plugged in through a plug-and-play implementation, discovery also may be during full operation of the computer system. An enhanced USB software stack can perform the enumeration of all peripherals attached to a UMTM CP.

At enumeration time, a USB generic parent driver implements a generic display class driver and a generic network class driver on the USB stack. The generic display class driver can detect a plugged in display peripheral device (either at boot or plugged in during computer operation). The generic display class driver fetches the extended display identification data (EDID) from the device and assigns it a USB endpoint address. The generic display class driver then issues a soft interrupt to a display miniport driver that is running on the graphics software stack. At this point the graphics software stack can take over the enumeration and configuration of the display peripheral device. Once the display peripheral device is enumerated, the enhanced USB software stack is not involved in any additional display data transfer. The display data transfer involves the display host controller and display software stack operating normally as if they were able to send data packets directly to the display peripheral device. The configuration of the network class driver operates in a similar fashion, only instead using the generic network class driver on the USB stack to discover the network peripheral device and passing control of network data transfers over to the network stack.

Figure 6:
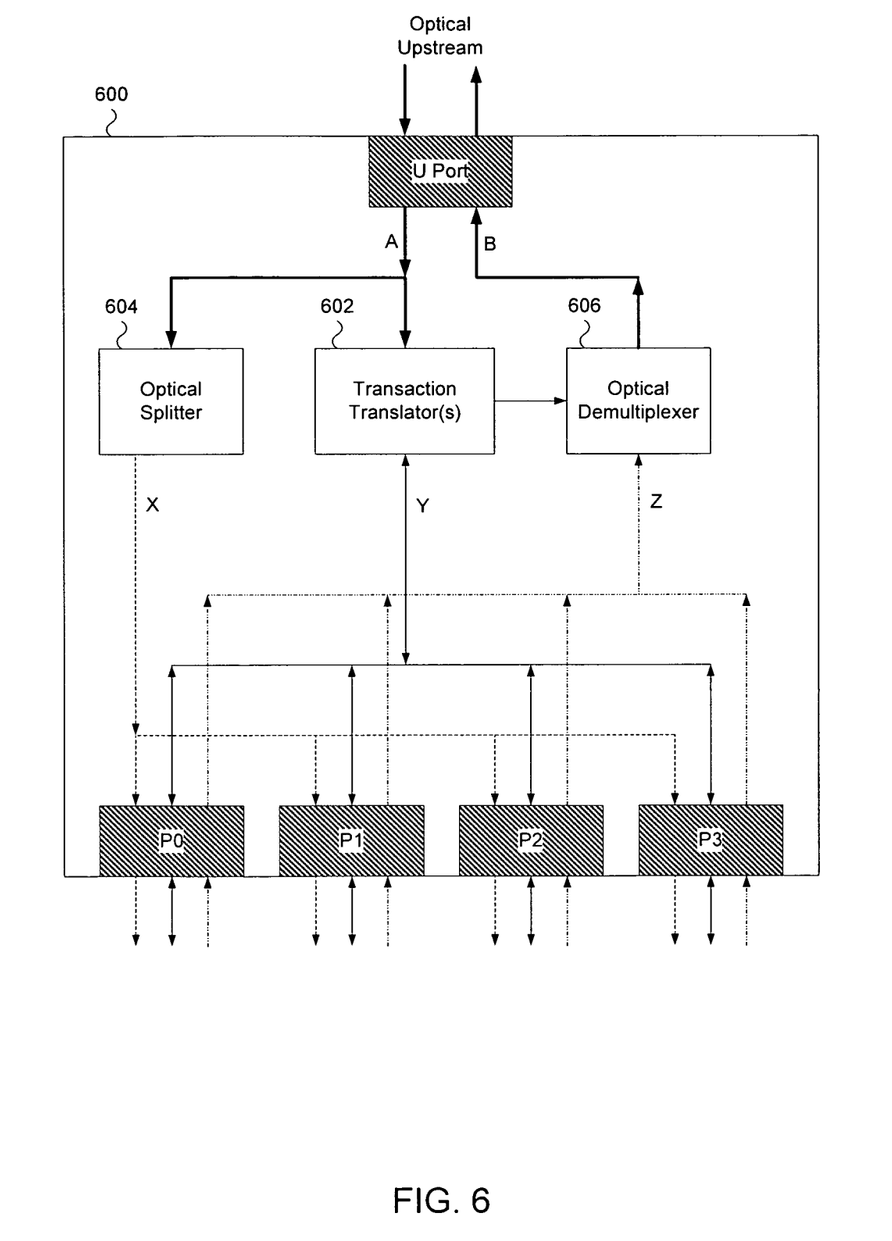
FIG. 6 describes an embodiment of a UMTM hub.

FIG. 6 describes an embodiment of a UMTM hub. In many embodiments, a UMTM hub utilizes the optical path in the upstream direction to a UMTM connector. For example, a hub is shown implemented in the system as shown in FIGS. 1 and 2. The hub can provide a low- or high-speed path (i.e. electrical or optical) to any further downstream peripheral devices coupled to the hub through hub ports P0-P3. The hub therefore includes two paths: an electrical path with a transaction translator to handle any low performance devices limited to the low-speed path (e.g. USB devices), and a passive optical path. The passive optical path performs passive splitting of the optical signal in the downstream direction to all ports. As a result, all downstream traffic is broadcast to all downstream ports (P0-P3) in a similar manner as a USB 2.0 hub. Attached peripheral devices will then filter the traffic they receive based on an endpoint identifier of the peripheral, which would be reflected in the data packets received.

For example, a data packet sent from the UMTM router/scheduler arrives within the optical signal on optical path A. The signal arrives at both transaction translator 602 and optical splitter 604. The transaction translator 602 (a transaction translator was explained in detail above in the discussion related to FIG. 3) translates the optical signal to an electrical signal and sends the data packet within the translated electrical signal across downstream path Y to ports P0-P3. The optical splitter 604 splits the optical signal received from optical path A into four optical downstream signals across optical path X. The peripheral device can also transmit a packet upstream. Once the upstream packet arrives into the hub 600 through one of the four ports (P0-P3), it will either take a path directly to optical demultiplexer 606 or through transaction translator 602.

The upstream packet path is based on whether the peripheral device is compatible with the high-performance optical path or compatible with only the low-performance electrical path. If the upstream data packet is transported on the electrical path, then the packet returns within the electrical signal on electrical path Y, the electrical signal is then translated back into an optical signal and sent to optical multiplexer 606. If the upstream packet is originating from a device compatible with the high-performance optical path then the signal will be returned on optical path Z, which feeds into optical demultiplexer 606.

Once the optical signal containing the data packet has arrived at optical demultiplexer 606, the signal is demultiplexed into a single optical upstream signal on optical path B. After being transported upstream across optical path B, the optical signal reaches the UMTM router/scheduler, which then multiplexes the signal to target the specific destination host controller of a given data packet.

Figure 7:
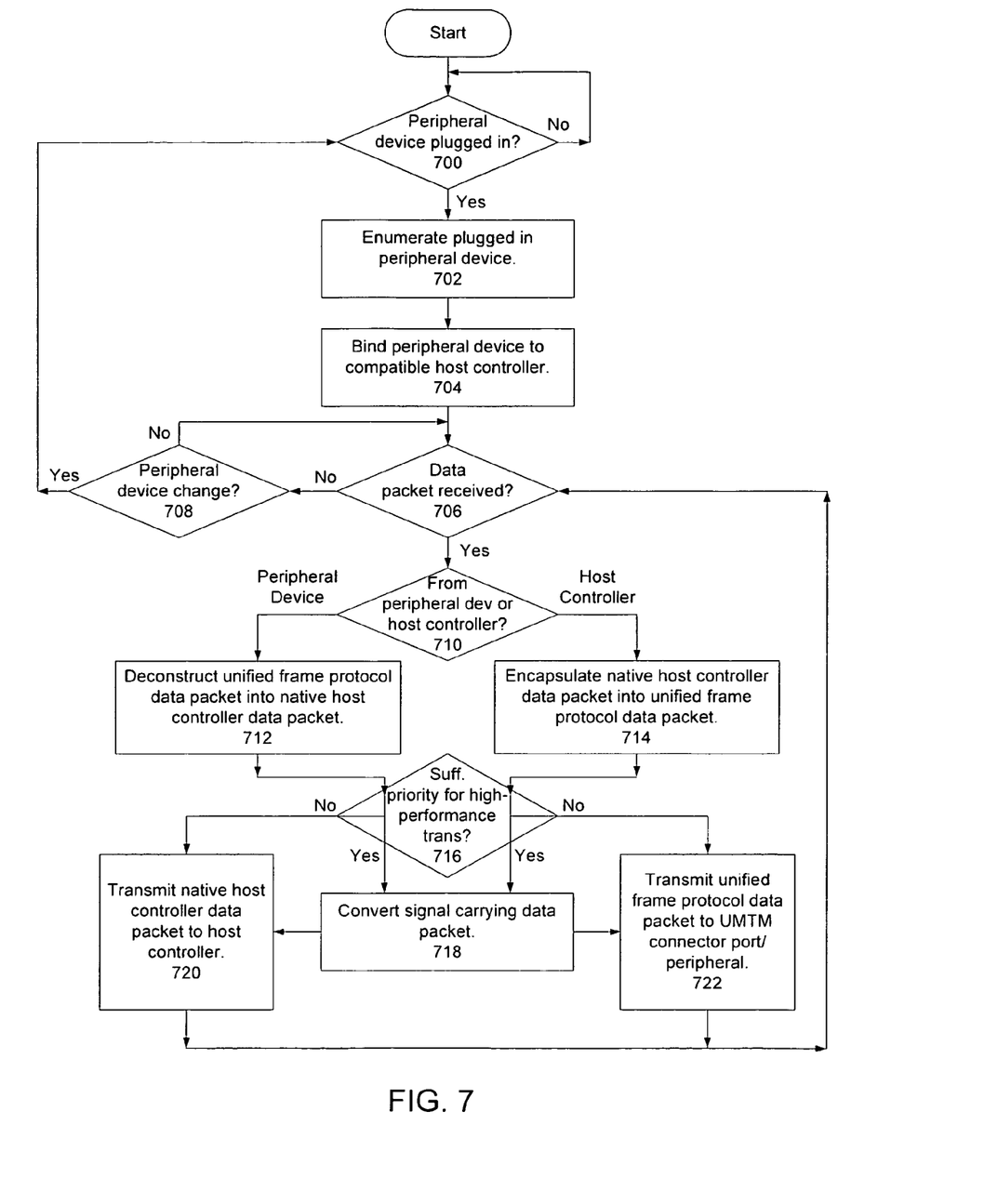
FIG. 7 is a flow diagram of one embodiment of a process to route data packets in a unified frame architecture environment.

FIG. 7 is a flow diagram of one embodiment of a process to route data packets in a unified frame architecture environment. The process may be performed by hardware, software, or a combination of both. Turning now to FIG. 7, the process begins by processing logic determining whether a peripheral device has been plugged into a UMTM connector port (processing block 700). "Plugging in" refers to the peripheral device being coupled or connected to the unified connector port. In different embodiments, the "plugging in" can occur at any time, such as prior to boot or during full system operation when hot-plugging is allowed. If no peripheral device has been plugged, then in processing block 700 repeats (i.e the UMTM connector port is polled—either continuously or a polling can occur once every set period of time).

Next, once processing logic has detected that the device has been plugged in, processing logic then enumerates the peripheral device (processing block 702). Then processing logic binds the peripheral device to a host controller present in the system (processing block 704). The peripheral device is bound to the host controller it is compatible with (i.e. they share the same protocol).

After the binding, processing logic determines whether a data packet has been received (processing block 706). If a data packet has not been received, processing logic determines whether there has been a change/modification in the peripheral device (processing block 708). For example, a first peripheral device has been unplugged and a second peripheral device has been plugged into the same unified connector port. If there is no change in the status of the peripheral device, processing logic returns to processing block 706 and again checks if a data packet has been received. Otherwise, if a change has been detected with the peripheral device, then processing logic returns to processing block 700 to recheck if a peripheral device is plugged into the unified connector port.

Returning to processing block 706, if a data packet has been received, processing logic determines whether the data packet has been received from the peripheral device or the host controller (processing block 710). If the data packet has been received from the peripheral device, then the data packet is a unified frame protocol data packet and processing logic proceeds to deconstruct the unified connector protocol data packet into one or more native host controller data packets that are compatible with the host controller's protocol (processing block 712). Processing logic then determines the priority level of the data packet. More specifically, based on the current traffic level of packets being processed versus the capacity of the high-performance optical link, does the data packet have a sufficiently high enough priority level to be designated for transport across the high-performance optical link (processing block 716).

If the packet's priority is sufficient for transport using the high performance optical link, then processing logic realizes this is an optically transmitted packet from the peripheral device and converts the signal carrying the packet from an optical signal to an electrical signal (processing block 718), then transmits the native host controller data packet to the host controller (processing block 720), and finally returns to processing block 706 to receive another data packet.

Returning to processing block 710, if the data packet is from the host controller then the data packet is in the host controller's native protocol format and processing logic proceeds to encapsulate the native host controller data packet into a unified frame protocol data packet (processing block 714). Once the unified frame protocol data packet has been created, processing logic then checks to see the data packet is a high performance data packet (processing block 716).

If the packet's priority is sufficient for transport using the high performance optical link, then processing logic realizes this packet needs to be converted from the electrical signal received from the transmitting host controller to an optical signal to be transported across the optical link to the peripheral device (processing block 718). Processing logic then transmits the unified frame protocol data packet to the UMTM connector port (which passes the signal through to a target peripheral device (processing block 722). Finally, processing logic returns to processing block 706 to receive another data packet.

Figure 8:
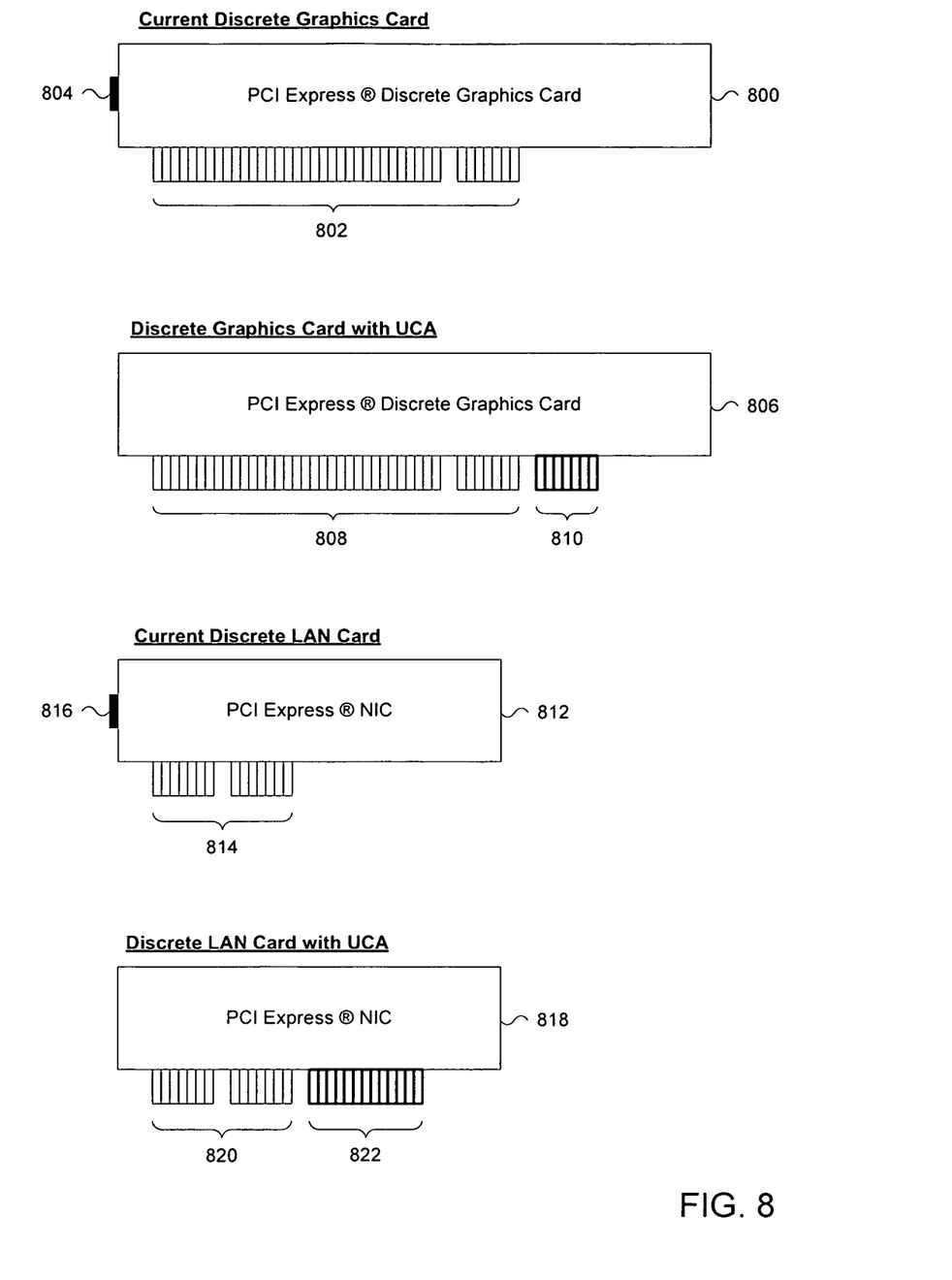
FIG. 8 describes an embodiment of the unified connector architecture slot connector for discrete graphics and local area network cards.

FIG. 8 describes an embodiment of the unified connector architecture slot connector for discrete graphics and local area network (LAN) cards. To illustrate the modifications to current discrete graphics and LAN cards, FIG. 3 shows a current version of each card side-by-side with a UMTM version of each card. The examples shown in FIG. 3 utilize PCI Express®, though any other relevant protocol may be used.

A current version of a PCI Express® discrete graphics card 800 is shown. Graphics card 800 includes a slot connector pins 802 as shown. Additionally, graphics card 800 has an external display peripheral connector 804. In current PCI Express® discrete graphics scenarios, data from the CPU and system memory is sent to the graphics card 800 across a PCI Express® link that is physically coupled to slot connector pins 802 when graphics card 800 is plugged into the PCI Express® graphics card slot on the computer system motherboard. The graphics card 800 then operates on this received data and sends it to a display peripheral plugged into external display peripheral connector 804.

Turning now to the discrete graphics card with UMTM 806, in the embodiment shown in FIG. 8, a UMTM-capable graphics card 806 includes the slot connector pins 808, similar to the current version graphics card 800. Although, instead of having an external display peripheral connector, the discrete graphics card with UMTM 806 has extra slot connector pins 810. Once the discrete graphics card with UMTM 806 has received data from the PCI Express® link (from slot connector pins 808) and has operated on the received data, the UMTM-capable graphics card 806 sends the data to a display peripheral plugged into a unified connector port on the motherboard. Specifically, the data is sent across additional PCI Express® link lanes are routed from the slot connector to the UMTM router/scheduler in the system (this is shown as link 132 in FIG. 1). These additional link lanes are physically coupled to the extra slot connector pins 810.

Next, FIG. 8 shows a current version of a PCI Express® discrete LAN card 812 (which has a NIC integrated on the card). LAN card 812 includes slot connector pins 814 as shown. Additionally, LAN card 812 has an external LAN/Ethernet connector 816. In current PCI Express® discrete LAN card scenarios, data from the CPU and system memory is sent to the LAN card 812 across a PCI Express® link that is physically coupled to slot connector pins 814 when LAN card 812 is plugged into a PCI Express® LAN card slot on the computer system motherboard. The LAN card 812 then packetizes this received data and sends it across the network that LAN/Ethernet connector 816 is plugged into.

Finally, turning now to the discrete LAN card with UMTM 818, in the embodiment shown in FIG. 8, a UMTM-capable LAN card 818 includes the slot connector pins 820, similar to the current version LAN card 812. Although, instead of having an external LAN/Ethernet connector, the discrete LAN card with UMTM 818 has extra slot connector pins 810. Once the discrete LAN card with UMTM 818 has received data from the PCI Express ® link (from slot connector pins 820) and has packetized the received data, the UMTM-capable LAN card 818 sends the data to an Ethernet cable plugged into a unified connector port on the motherboard. Specifically, the data sent across additional PCI Express ® link lanes are routed from the slot connector to the UMTM router/scheduler in the system (this is shown as link 134 in FIG. 1). These additional link lanes are physically coupled to the extra slot connector pins 822.

Thus, embodiments of a device, method, and system to implement unified multi-transport medium connector architecture are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method for routing packets from an apparatus, wherein the apparatus includes a plurality of universal multi-transport medium (UMTM) connectors having a form factor configured to physically couple to a plug, wherein each UMTM connector comprises an electrical coupling to transport an electrical signal and an optical coupling to transport an optical signal, the method comprising:
    selectively encapsulating, by a router coupled to a plurality of data transmission paths, packets from a first host controller or from a second host controller into first unified connector protocol frames according to a unified connector protocol;
    selectively transmitting, by the router, at least some of the first unified connector protocol frames to a first UMTM connector within the optical signal across at least a portion of a first data transmission path in the plurality of data transmission paths or within the electrical signal across the entire first data transmission path;
    wherein (1) if the first UMTM connector is coupled to a first peripheral device through the plug, said selectively transmitting is capable of transmitting encapsulated packets from the electrical coupling to the first peripheral device using the electrical signal only, and (2) if the first UMTM connector is coupled to a second peripheral device through the plug, said selectively transmitting is capable of transmitting encapsulated packets from the optical coupling to the second peripheral device using the optical signal only.

2. The method of claim 1, further comprising:
    determining, by the router, a priority level of each of the unified connector protocol frames;
    determining, by the router, a minimum required priority level for transport within the optical signal;
    causing, by the router, the unified connector protocol frames to be transmitted using the optical signal when the priority of the unified connector protocol frames is at least equal to the minimum required priority level; and
    causing, by the router, the unified connector protocol frames to be transmitted using the electrical signal when the priority of the unified connector protocol frames is less than the minimum required priority level.

3. The method of claim 2, further comprising:
    scheduling, by the router, transmission of the first unified connector protocol frames over the first data transmission path of the first peripheral device, the first unified connector protocol frames originating from the first host controller, and transmission of second unified connector protocol frames over a second data transmission path to a third peripheral device coupled to the router through a second UMTM connector and another plug, the second unified connector protocol frames originating from the second host controller, in an order determinative at least in part based on the priority level of each of the frames.

4. The method of claim 3, further comprising:
    receiving, by the router, each of the first unified connector protocol frames and the second unified connector protocol frames from one or more isochronous data pipes being populated by one or more of the plurality of host controllers;
    storing, by the router, each of the first unified connector protocol frames and the second unified connector protocol frames received from the one or more isochronous data pipes into one or more output buffers in an order based on the priority level of each of the first unified connector protocol frames and the second unified connector protocol frames; and
    transmitting, by the router, each of the first unified connector protocol frames and the second unified connector protocol frames in the order as stored in the one or more output buffers.

5. The method of claim 1, wherein the method further comprises:
    dynamically enumerating, by the router, a given peripheral device when the given peripheral device is coupled to the router through the plug; and
    communicating, by the router, with the plugged-in given peripheral device using an optical signal when the plugged-in given peripheral device is capable of receiving optical signals; and
    communicating, by the router, with the plugged-in given peripheral device using an electrical signal when the plugged-in given peripheral device is not capable of receiving optical signals.

6. A system, comprising:
    a plurality of data transmission paths, wherein at least a portion of each of the plurality of data transmission paths comprises both an electrical path to transmit data packets within an electrical signal and an optical path to transmit data packets within an optical signal;
    a plurality of universal multi-transport medium (UMTM) connectors having a form factor configured to physically couple to a plug, and coupled to each individual path of the plurality of data transmission paths, wherein each UMTM connector comprises an electrical coupling to transport the electrical signal and an optical coupling to transport the optical signal; and a router, coupled to the plurality of data transmission paths, to selectively encapsulate packets from a first host controller or from a second host controller into first unified connector protocol frames according to the unified connector protocol and transmit at least some of the first unified connector protocol frames to a first UMTM connector, wherein the router determines whether to transmit the encapsulated packets within the optical signal across at least a portion of a first data transmission path or transmit the encapsulated packets within the electrical signal across the entire first data transmission path;

wherein (1) if the first UMTM connector is coupled to a first peripheral device through the plug, the first UMTM connector is capable of transmitting encapsulated packets from the electrical coupling to the first peripheral device using the electrical signal only, and (2) if the first UMTM connector is coupled to a second peripheral device through the plug, the first UMTM connector is capable of transmitting encapsulated packets from the optical coupling to the second peripheral device using the optical signal only.

7. The system of claim 6, wherein the router is further operable to:

determine a priority level of each of the first unified connector protocol frames;

determine a minimum required priority level for transport within the optical signal;

cause the first unified connector protocol frames to be transmitted using the optical signal when the priority of the first unified connector protocol frames is at least equal to the minimum required priority level; and cause the first unified connector protocol frames to be transmitted using the electrical signal when the priority of the first unified connector protocol frames is less than the minimum required priority level.

8. The system of claim 6, further comprising:

a second UMTM connector to couple to a second path of the plurality of data transmission paths;

a scheduler, coupled to the plurality of data transmission paths, to schedule transmission of the first unified connector protocol frames over the first data transmission path to a first peripheral device coupled to the router through the plug, the first unified connector protocol frames originating from the first host controller, and transmission of second unified connector protocol frames over a second data transmission path to a third peripheral device coupled to the router through a second UMTM connector and another plug, the second unified connector protocol frames originating from the second host controller, in an order determinative at least in part based on the priority level of each of the frames.

9. The system of claim 8, further comprising:

the scheduler being further operable to:

receive each of the first unified connector protocol frames and the second unified connector protocol frames from one or more isochronous data pipes being populated by at least the first and second host controllers; and store each of the first unified connector protocol frames and the second unified connector protocol frames received from the one or more isochronous data pipes into one or more output buffers in the scheduler in an order based on the priority level of each first unified connector protocol frames and the second unified connector protocol frames; and the router being further operable to:

transmit each of the first unified connector protocol frames and the second unified connector protocol frames in the order as stored in the one or more output buffers.

10. The system of claim 7, further comprising:

a unified connector hub, coupled to a second data transmission path of the plurality of data transmission paths through a second of the plurality of UMTM connectors, wherein the hub includes a plurality of downstream UMTM connectors, the hub to:

receive a second unified connector protocol frame from the router within the optical signal;

convert the received optical signal to a corresponding electrical signal;

split the received optical signal into a plurality of the optical signal; and transmit the corresponding electrical signal and the split optical signal to each of the plurality of downstream UMTM connectors.

11. The system of claim 6, wherein the first and second host controllers transmit data packets to the router and receive data packets from the router within an electrical signal.

12. The system of claim 6, wherein the router is further operable to:

dynamically enumerate a given peripheral device when the given peripheral device is coupled to the router through the plug; and communicate with the plugged-in given peripheral device using an optical signal when the plugged-in given peripheral device is capable of receiving optical signals; and communicate with the plugged-in given peripheral device using an electrical signal when the plugged-in given peripheral device is not capable of receiving optical signals.

13. The system of claim 6, further comprising:

at least one host controller comprising a display controller capable of sending high performance data packets; and at least one host controller comprising a network controller capable of sending and receiving high performance data packets.

14. The system of claim 6, wherein the router is further configured to translate unified connector protocol frames from one or more peripheral devices to data packets of the first protocol and transmit the data packets to the first host controller, and to translate unified connector protocol frames from one or more peripheral devices to data packets of the second protocol and transmit the data packets to the second host controller.

* * * * *